United States Patent
Zha et al.

[11] Patent Number: 6,156,200
[45] Date of Patent: Dec. 5, 2000

[54] GAS-SCRUBBED HOLLOW FIBER MEMBRANE MODULE

[75] Inventors: Fufang Zha, Hurlstone Park, Australia; Clinton V. Kopp, Bismarck, N. Dak.; Robert J. McMahon, Concord, Australia; Warren T. Johnson, Bligh Park, Australia; Thomas W. Beck, North Richmond, Australia

[73] Assignee: USF Filtration & Separations Group, Inc., Timonium, Md.

[21] Appl. No.: 09/208,294

[22] Filed: Dec. 8, 1998

[51] Int. Cl.[7] .................................................. B01D 63/04
[52] U.S. Cl. ................ 210/321.89; 210/321.69; 210/321.8; 210/321.79; 210/636
[58] Field of Search ................ 210/636, 321.78, 210/321.79, 321.69, 321.8, 321.89, 500.23, 760

[56] References Cited

U.S. PATENT DOCUMENTS

| | | | |
|---|---|---|---|
| 4,540,490 | 9/1985 | Shibata et al. | 210/323.2 |
| 4,756,875 | 7/1988 | Tajima et al. | 376/313 |
| 4,876,006 | 10/1989 | Ohkubo et al. | 210/321.69 |
| 5,151,191 | 9/1992 | Sunaoka et al. | 210/644 |
| 5,192,456 | 3/1993 | Ishida et al. | 210/791 |
| 5,209,852 | 5/1993 | Sunaoka et al. | 210/636 |
| 5,248,424 | 9/1993 | Cote et al. | 210/636 |
| 5,403,479 | 4/1995 | Smith et al. | 210/321.69 |
| 5,480,553 | 1/1996 | Yamamori et al. | 210/650 |
| 5,607,593 | 3/1997 | Cote et al. | 210/650 |
| 5,639,373 | 6/1997 | Mahendran et al. | 210/636 |
| 5,643,455 | 7/1997 | Kopp et al. | 210/636 |
| 5,783,083 | 7/1998 | Henshaw et al. | 210/636 |
| 5,910,250 | 6/1999 | Mahendran et al. | 210/636 |
| 5,944,997 | 8/1999 | Pedersen et al. | 210/636 |

FOREIGN PATENT DOCUMENTS

| | | | |
|---|---|---|---|
| 0 734 758 A1 | 10/1996 | European Pat. Off. | |
| 61-107905 | 5/1986 | Japan . | |
| 62-004408 | 1/1987 | Japan . | |
| 62-114609 | 5/1987 | Japan . | |
| S63-38884 | 10/1988 | Japan . | |
| 2-164423 | 6/1990 | Japan . | |
| 7-000770 | 1/1995 | Japan . | |
| 7-275665 | 10/1995 | Japan . | |
| 8-010585 | 1/1996 | Japan . | |
| 9-141063 | 6/1997 | Japan | B01D 63/02 |
| WO 93/23152 | 11/1993 | WIPO . | |
| WO 96/07470 | 3/1996 | WIPO . | |
| WO 98/28066 | 7/1998 | WIPO | B01D 65/08 |

*Primary Examiner*—Ana Fortuna
*Attorney, Agent, or Firm*—Knobbe, Martens, Olson and Bear LLP

[57] ABSTRACT

A method and apparatus for removing fouling materials from the surface of a plurality of porous membranes (9) arranged in a membrane module (4) by providing, from within the module, by means (10) other than gas passing through the pores of said membranes, gas bubbles in a uniform distribution relative to the porous membrane array such that the bubbles move past the surfaces of the membranes (9) to dislodge fouling materials therefrom. The membranes (9) are arranged in close proximity to one another and mounted to prevent excessive movement therebetween. The bubbles also produce vibration and rubbing together of the membranes to further assist removal of fouling materials.

5 Claims, 15 Drawing Sheets

GAS-SCRUBBED HOLLOW FIBER MEMBRANE MODULE

BACKGROUND OF THE INVENTION

1. Technical Field

The present invention relates to the use of a gas bubble system to remove fouling materials from the surface of membranes used in filtration systems and the like.

2. Background Art

A variety of membrane filtration systems are known and many of these use pressurised systems operating at high transmembrane pressures (TMP) to produce effective filtering and high filtrate flux. These systems are highly effective but are also expensive to produce, operate and maintain. Simpler systems using membrane arrays freely mounted vertically in a tank and using suction applied to the fibre lumens to produce TMP have also been developed, however, these systems have been found in the past to be less effective than the pressurised systems.

Examples of such known systems are illustrated in U.S. Pat. No. 5,192,456 to Ishida et al, U.S. Pat. No. 5,248,424 to Cote et al and WO 97/06880 to Zenon Environmental Inc.

The Ishida et al patent describes an activated sludge treating apparatus where air flow is used to clean the outer surface of the filter membrane. In this arrangement the air blower used for biological treatment of the waste water is also used as a secondary agitation source to clean the surface of the membranes. The membrane modules are of the plate type. The membranes also have a low packing density and thus do not have the problems associated with cleaning tightly packed fibre bundles. Air is bubbled from beneath the modules and is supplied externally from the membrane array.

The Cote et al patent again describes a system of cleaning arrays of fibres. In this case the fibres are mounted in a skein to form an inverted U-shaped or parabolic array and the air is introduced below the array to produce bubbles which contact the fibres with such force they keep the surfaces relatively free of attached microorganisms and deposits of inanimate particles. The fibres are freely swayable as they are only attached at either end and this assists removal of deposits on their outer surface. The bubbles of gas/air flow are provided from a source external of the fibre bundle and move generally transverse to the lengths of fibre. This limits the depth of fibre bundle which can be effectively cleaned.

The invention disclosed in the Zenon Environmental, Inc. PCT Application No. WO 97/06880 is closely related to the Cote et al patent. In this document the fibres are unconfined, vertically arranged and dimensioned to be slightly longer than the distance between the opposed faces of the headers into which the fibre ends are mounted to allow for swaying and independent movement of the individual fibres. The skein is aerated with a gas distribution means which produces a mass of bubbles which serve to scrub the outer surface of the vertically arranged fibres as they rise upwardly through the skein.

Our own international Patent Application WO96/07470 describes an earlier method of cleaning membranes using a gas backwash to dislodge material from the membrane walls by applying a gas pressure to the filtrate side of the membranes and then rapidly decompressing the shell surrounding the feed side of the membranes. Feed is supplied to the shell while this gas backwash is taking place to cause turbulence and frothing around the membrane walls resulting in further dislodgment of accumulated solids.

DISCLOSURE OF THE INVENTION

The present invention relates particularly to a plurality of porous membranes arranged to form a membrane module arranged in a relatively tightly packed bundle. These porous membranes may be in the form of fibres or plate type membranes as described in the above prior art.

The present invention seeks to overcome or at least ameliorate the problems of the prior art by providing a simple effective system and method for removing fouling materials from the surface of the porous membranes by use of gas bubbles.

According to one aspect, the present invention provides a method of removing fouling materials from the surface of a plurality of porous membranes arranged in a membrane module by providing, from within the module, by means other than gas passing through the pores of said membranes, gas bubbles in a uniform distribution relative to the porous membrane array such that said bubbles move past the surfaces of said membranes to dislodge fouling materials therefrom, said membranes being arranged in close proximity to one another and mounted to prevent excessive movement therebetween. The porous membranes may comprise hollow fibre membranes. Preferably, the fibre membranes are arranged in bundles surrounded by a perforated cage which serves to prevent said excessive movement therebetween.

According to a second aspect, the present invention provides a membrane module comprising a plurality of porous membranes, said membranes being arranged in close proximity to one another and mounted to prevent excessive movement therebetween, and means for providing, from within the module, by means other than gas passing through the pores of said membranes, gas bubbles such that, in use, said bubbles move past the surfaces of said membranes to dislodge fouling materials therefrom.

The gas bubbles may be provided from within the module by a variety of methods including gas distribution holes or openings in the pot used to mount the membranes, a porous tube located within the module or a tube or tubes positioned to output gas within the module, the tubes may be in the form of a comb of tubes containing holes which sit within the module. Another method of providing gas bubbles includes creating gas in-situ by means of spark type ozone generators or the like. Further types of gas provision are detailed below and in the preferred embodiments of the invention.

According to one preferred form, the present invention provides a method of removing fouling materials from the surface of a plurality of porous hollow fibre membranes mounted and extending longitudinally in an array to form a membrane module, said membranes being arranged in close proximity to one another and mounted to prevent excessive movement therebetween, the method comprising the steps of providing, from within said array, by means other than gas passing through pores of said membranes, uniformly distributed gas bubbles, said distribution being such that said bubbles pass substantially uniformly between each membrane in said array to scour the surface of said membranes and remove accumulated solids from within the membrane module.

For preference, said membranes are mounted vertically to form said array and said bubbles pass generally parallel to the longitudinal extent of said fibres. Preferably, said uniformly distributed gas bubbles are provided at the lower end of the array. Optionally, a backwash may be used in conjunction with the removal process to assist solids removal from the membrane pores and outer surface of the membranes.

For preference, the membranes comprise porous hollow fibres, the fibres being fixed at each end in a header, the lower header having a plurality of holes formed therein through which gas is introduced to provide the gas bubbles. The fibres are normally sealed at the lower end and open at their upper end to allow removal of filtrate. Some of the fibres may also be used to provide bubbles of scouring gas to the array by feeding gas through selected ones of the fibre sin the array. The fibres are preferably arranged in cylindrical arrays or bundles.

Filtrate is normally withdrawn from the fibres by application of suction applied thereto, however, it will be appreciated that any suitable means of providing TMP may be used. A porous sheet may be used in conjunction with the holes or separately to provide a more uniform distribution of gas bubbles. The porous sheet also provides the added advantage of preventing solids ingressing into the air supply plenum chamber.

According to a further preferred aspect, the present invention provides a membrane module comprising a plurality of porous hollow membrane fibres extending longitudinally between and mounted at each end to a respective potting head, said membrane fibres being arranged in close proximity to one another and mounted to prevent excessive movement therebetween, one of said potting heads having a uniform distributed array of aeration holes formed therein and said fibres being substantially uniformly mounted in said one potting head relative to said aeration holes.

According to a preferred further aspect, the present invention provides a filtration system including a membrane module according to said second aspect wherein said filter module is positioned vertically in a tank containing feed liquid to be filtered, means to apply a transmembrane pressure to said fibres in said array to cause filtrate to pass through pores in said fibres and means to supply continually or intermittently a supply of gas to said aeration holes so as to produce gas bubbles which move upwardly and uniformly between said fibres to scour the outer surfaces thereof.

Optionally, when the module is contained in a separate vessel, periodic draindown of the vessel is carried out after the scouring step to remove solids accumulated during the scouring process. Apart from draindown, other methods can be used for accumulated solids removal. These include continual bleed off of concentrated feed during the filtration cycle or overflow at the top of the tank by pumping feed into the base of the tank at regular intervals at a rate sufficient to cause overflow and removal of accumulated solids. This would be typically done at the end of a backwash cycle.

It should be understood that the term "gas" used herein includes any gas, including air and mixtures of gases as well as ozone and the like.

It will be appreciated that the above described invention may be readily applied to our own modular microporous filter cartridges as used in our continuous microfiltration systems and described in our earlier U.S. Pat. No. 5,405,528. These cartridges may be modified by providing gas distribution holes in the lower plug and providing a manifold for supplying gas to said holes such that, in use, the gas passes through the holes and forms scouring bubbles which pass upward through the filter medium. In a preferred arrangement, the filter medium would be sealed at the lower end and filtrate withdrawn under a vacuum from the upper end while the cartridge or cartridges were positioned in a tank containing the feed.

The embodiments of the invention will be described in relation to microporous fibre membranes, however, it will be appreciated that the invention is equally applicable to any form of membrane module.

BRIEF DESCRIPTION OF THE DRAWINGS

Preferred embodiments of the present invention will now be described, by way of example only, with reference to the accompanying drawings in which.

MODES FOR CARRYING OUT THE INVENTION

Figure 1:
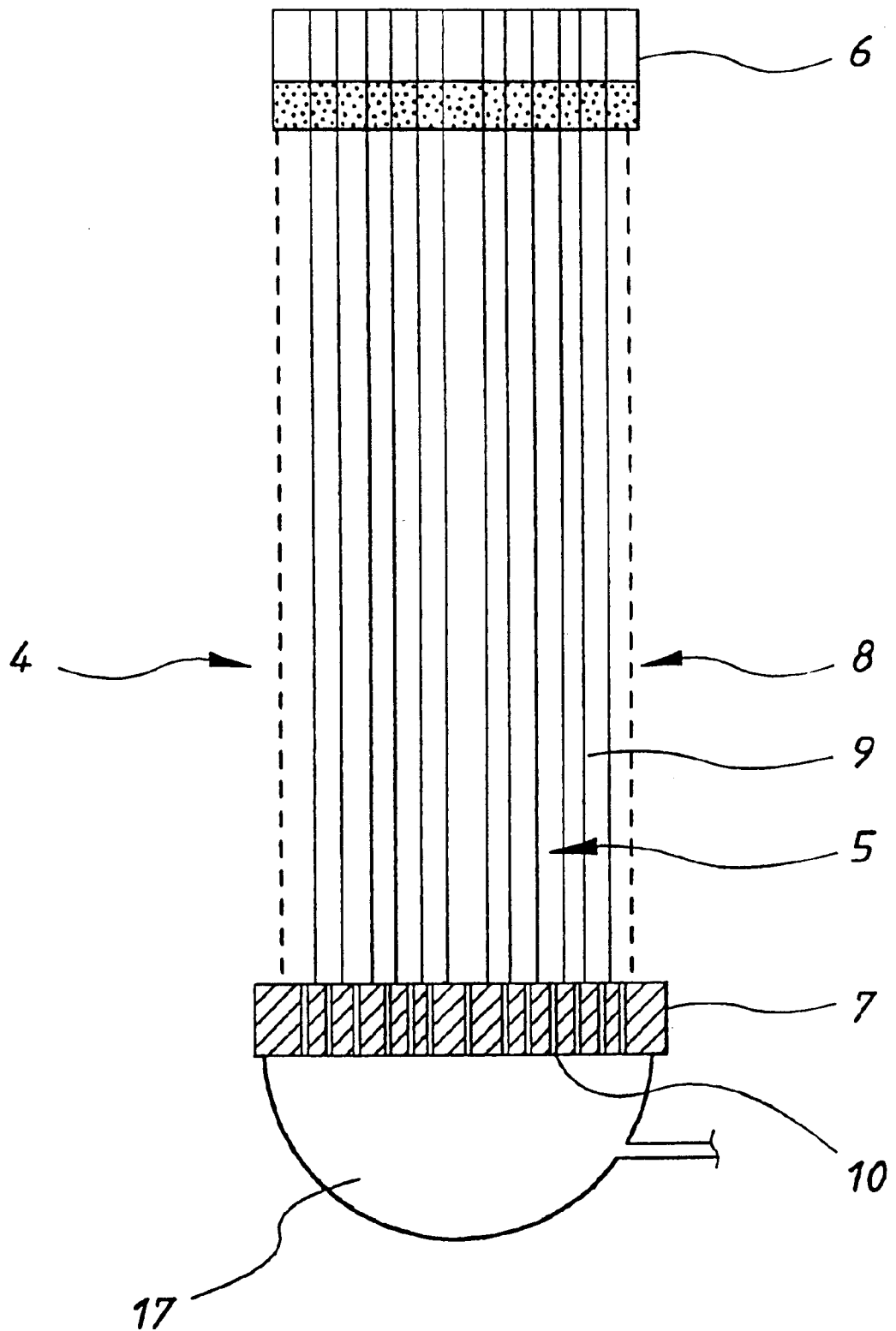
FIG. 1 shows a simplified cross-sectional view of one embodiment of a membrane module in accordance with the present invention.

Referring to FIG. 1, the membrane module 4, according to this embodiment, comprises a cylindrical array or bundle of hollow fibre membranes 5 extending longitudinally between upper and lower potting heads 6, 7. Optionally, a screen or cage 8 surrounds the array 5 and serves to hold the fibres 9 in close proximity to each other and prevent excessive movement. The fibres 9 are open at the upper potting head 6 to allow for filtrate removal from their lumens and sealed at the lower potting head 7. The lower potting head 7 has a number of holes 10 uniformly distributed therein to enable gas/air to be supplied therethrough. The fibres are fixed uniformly within the potting heads 6 and 7 and the holds 10 are formed uniformly relative to each fibre 9 so as to provide, in use, a uniform distribution of gas bubbles between the fibres.

The holes are formed as part of the potting process as described below. The arrangement of the holes relative to one another as well as the arrangement of fibres relative to the holes and each other has been found to effect the scouring efficiency of the gas bubbles.

The maldistribution of gas within the fibre bundle can be overcome by appropriate distribution and sizing of holes to ensure that bubble flow around the fibres is uniform across the bundle. In a cylindrical bundle of closely packed fibres it has been found that the distance travelled through the bundle by bubbles introduced towards the centre of the bundle is larger than those introduced towards the outer extremity of the bundle, resulting in a higher resistance to bubble flow a the centre of the bundle than at its border or periphery.

As outlined above, one method of addressing the maldistribution of gas bubbles is to provide a porous sheet across the holes to provide an even pore distribution and thus a uniform gas flow. Another method is to provide a distribution of hole size relative to the distribution of resistance. Since the gas flowrate (Q) per unit area (A) is inversely proportional to the resistance (R), $$Q/A \sim 1/R$$

the relationship between the hole diameter (d) and the resistance becomes $$d \sim (R)^{1/2}$$

using the above relationship it is possible to design a hole size and position configuration which compensates for resistance differences within the bundle. For example, if the resistance at the centre of the bundle is 50% higher than that at its periphery, the hole size at the centre ($d_c$) and on the periphery ($d_p$) would be the following for a uniform distribution of gas:

$$d_c/d_p = 1.5^{0.5} = 1.22$$

Known methods of forming holes require the drilling of holes or other forms of post-potting formation. Such methods have the disadvantage of requiring avoidance of the fibres/membranes when drilling or the like to avoid damage. This imposes limitations on the fibre packing density and hole size as, where fibres are tightly packed, it is very difficult to drill holes without interfering with or damaging the fibres. Further, it is difficult to accurately locate holes relative to the fibres/membranes.

The process used in one aspect of the present invention seeks to overcome or at least the ameliorate the problems and disadvantages outlined above.

According to this aspect, the present invention provides a method of forming openings in a membrane pot for use in gas distribution comprising the steps of:

providing a mould for potting membrane ends, said mould having provided therein formations for forming said openings during the potting process;

positioning said membrane ends in said mould which is filled with a curable potting material;

allowing said potting material to at least partially cure and, demoulding said membranes.

Preferably, said membranes ends are uniformly distributed in relation to said formations. In another aspect, the invention includes a membrane assembly including at least one membrane pot formed according to the above method.

Figure 2:
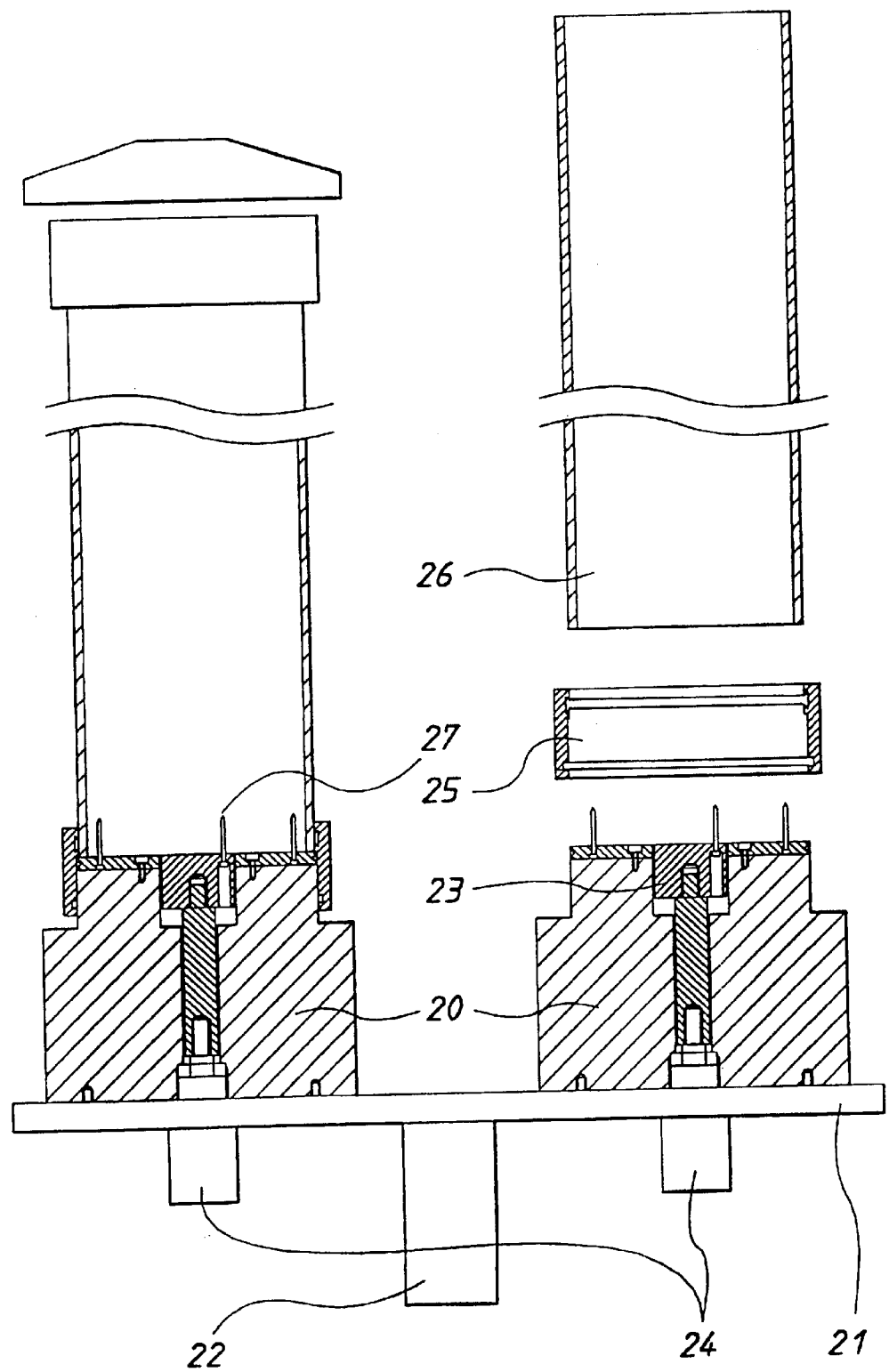
FIG. 2 shows a simplified two part representation of the potting arrangement of the membrane module according to one preferred form of the invention.
Figure 3:
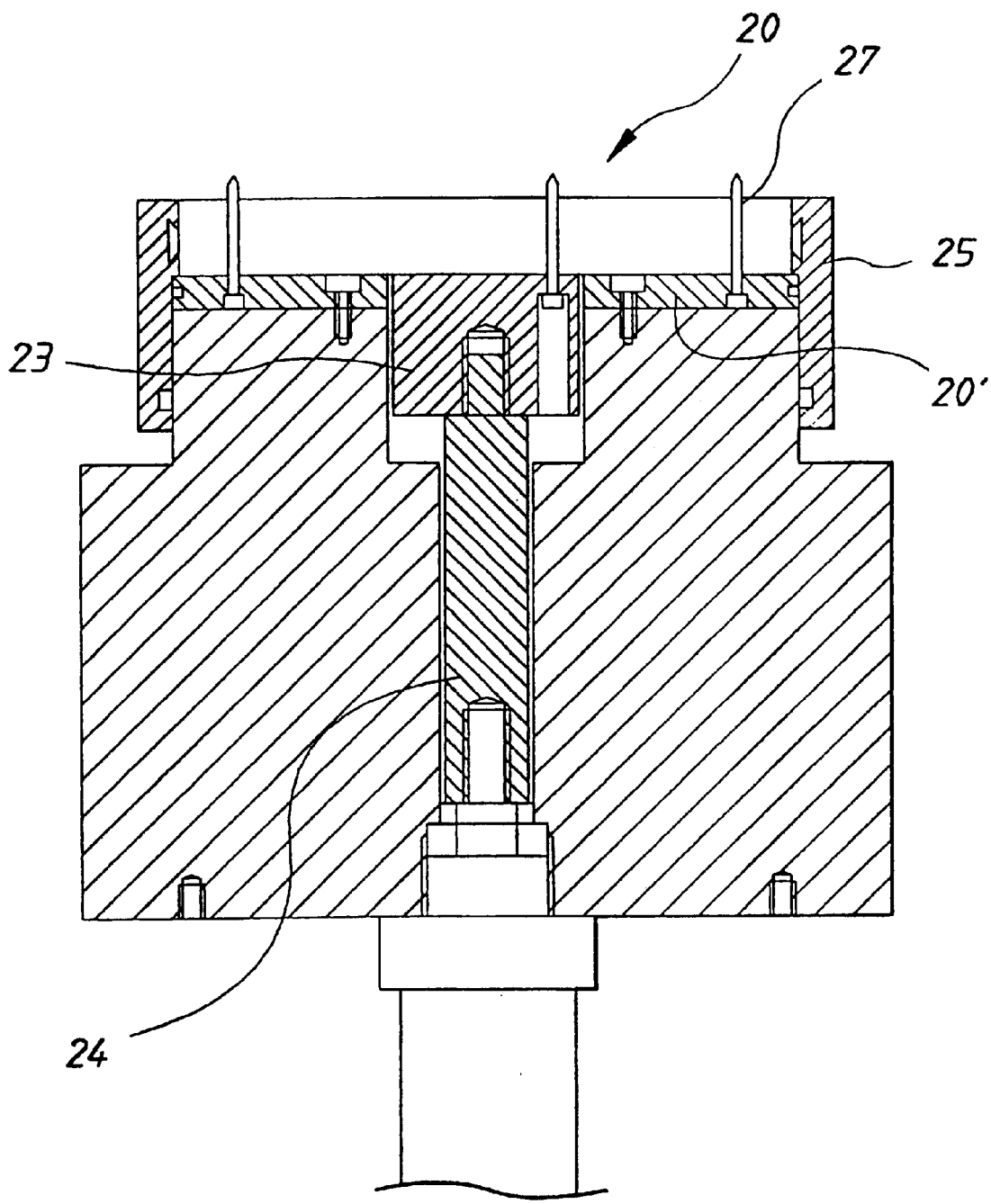
FIG. 3 shows an enlarged view of the potting base of FIG. 2.
Figure 4A:
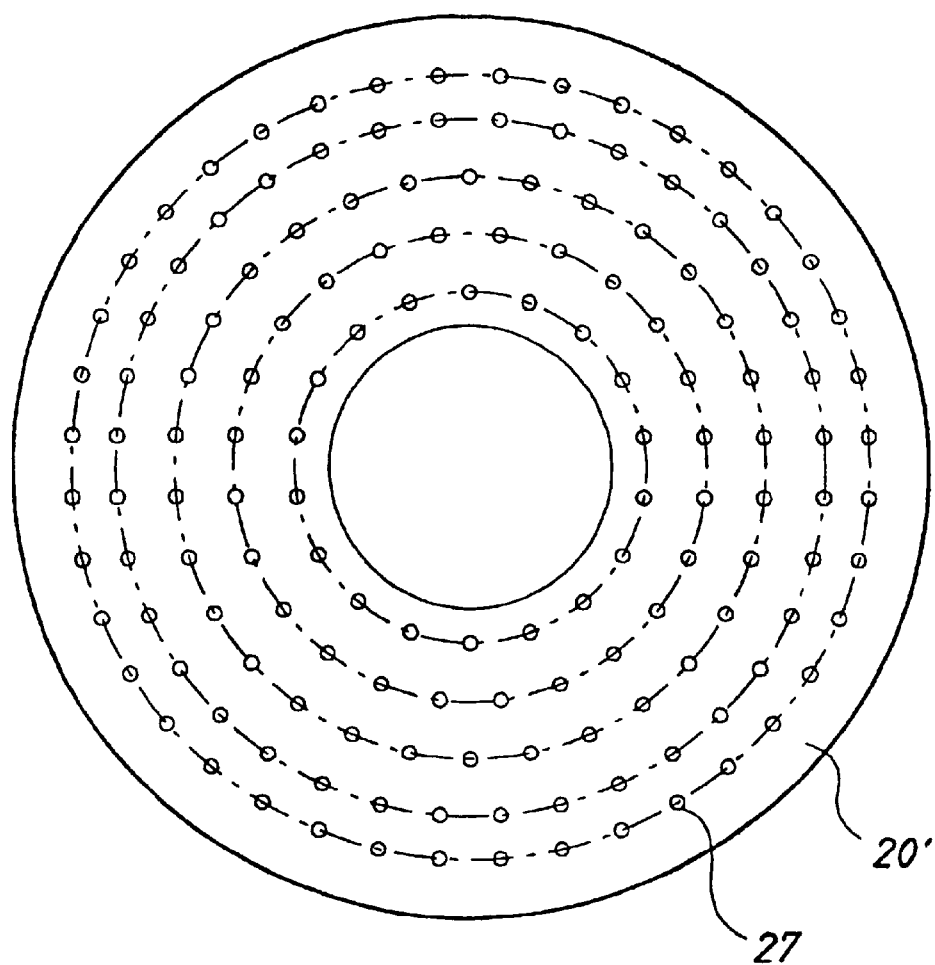
FIGS. 4A and 4B show the pin formations in the annular portion of the potting base and the plunger portion of the potting base, respectively.
Figure 4B:
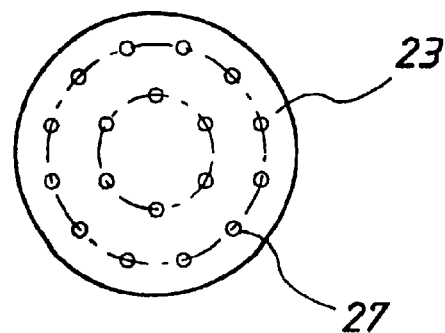

Referring to FIGS. 2–4, the preferred method of forming the gas distribution holes will be described. As shown in the right side part of FIG. 2, the potting apparatus (shown empty) comprises a potting mould 20 mounted on a vertically movable platform 21 which is raised and lowered by means of hydraulic cylinder 22. The center of each mould 20 is provided with a vertically movable ejector plunger 23 operated by and hydraulic ejector cylinder 24. A fibre guide or collar 25 fits around the periphery of the mould to guide and hold the fibre ends during the potting process as well as retaining the potting mixture, typically polyurethane, within the mould. The fibres are held within a sleeve 26 when inserted into the guide 25. The base 20' of the mould 20 has a plurality of upstanding pins 27 which serve the dual purpose of assisting even distribution of the fibre ends and forming the gas distribution holes in the pot. The pins are sized and distributed as required for correct gas bubble distribution. One form of pin distribution is shown in FIG. 4.

In use, the guide 25 is placed about the mould 20 and the mould 20 filled to the required level with potting material. The platform 21 is then raised to lower the fibre ends into the mould 20. The fibre ends are normally fanned before insertion to ensure even distribution and also trimmed to ensure a uniform length.

Once the potting material has partially cured, the pot is ejected from the mould by raising the central ejector portion 23 of the mould. The mould 20 is normally heated to assist curing. If desired, the mould 20 may be centrifuged during the potting process to assist the penetration of the potting material into the fibre walls.

This process normally results in the ends of the fibre in this pot being sealed, however, it will be appreciated that, by appropriate transverse cutting of the pot, the fibre ends may be opened for withdrawal of filtrate from the lumens.

A trial module 4 of this type was packed with 11,000 fibres (o.d/i.d. 650/380 $\mu$m). The fibre lumens at the lower end were blocked with polyurethane and 60 holes of 4.5 mm in diameter distributed within the fibre bundle. The lower end was connected to an air line sealed from the feed.

Figure 5:
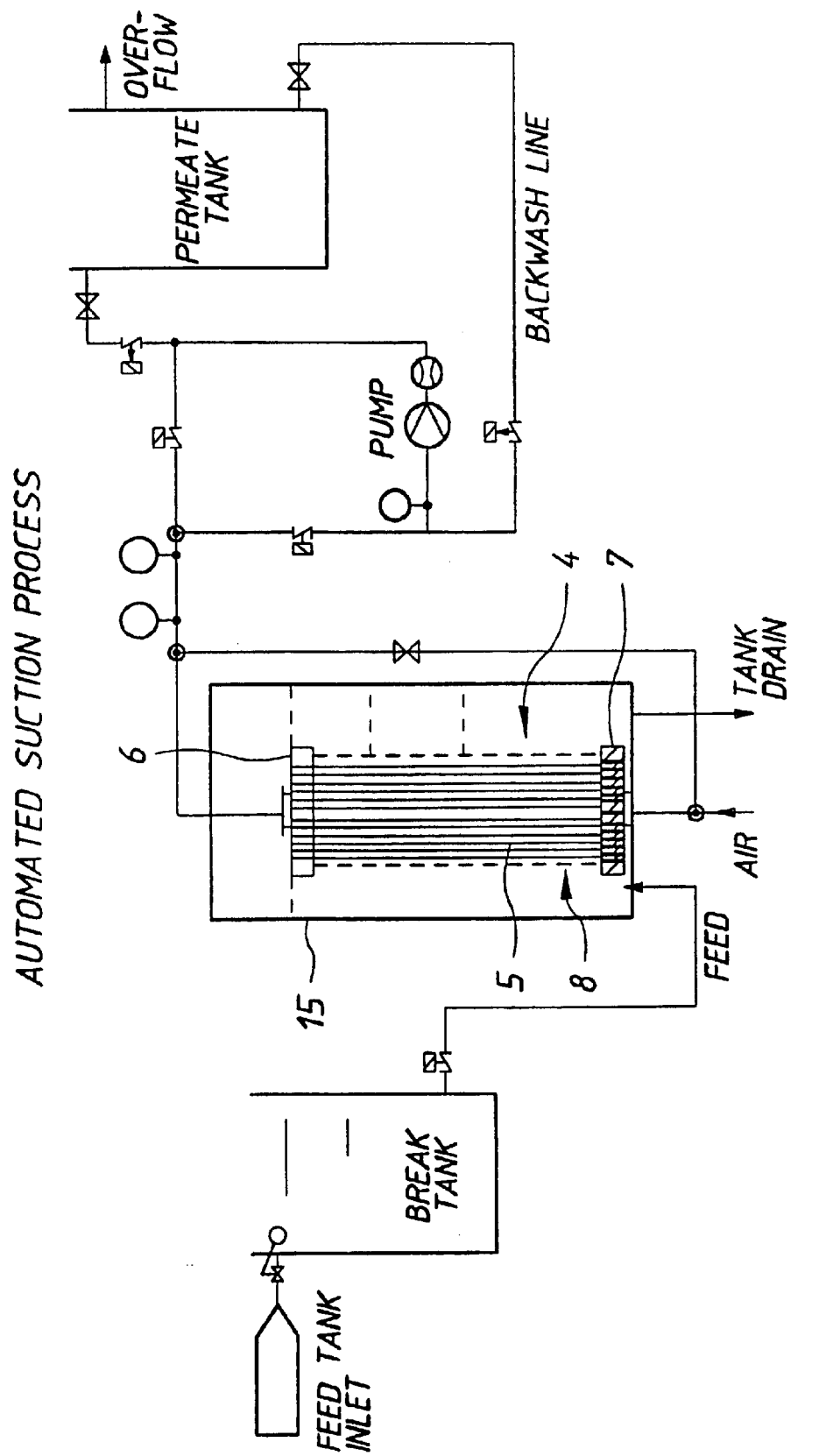
FIG. 5 shows schematic diagram of a filtration system using the membrane module of FIG. 1.

FIG. 5 illustrates the setup of the trial unit. The module 4 was arranged vertically in the cylinder tank 15 and the filtrate withdrawn from the top potting head 6 through suction. Air was introduced into the bottom of the module 4, producing air bubbles between fibres to scrub solids accumulated on membrane surfaces. To remove solids clogged within membrane pores, a small quantity of permeate was pumped through fibre lumens (permeate backwash). One method of operation was to run suction for 15 minutes, then aeration for 2 minutes 15 seconds. After a first minute of aeration, a permeate backwash is introduced for 15 seconds. The cycle returns to suction. After several cycles, the solids in the cylinder tank 15 were concentrated and the water in the tank 15 was drained down to remove concentrated backwash.

In the preferred embodiment shown in FIG. 1, gas/air should be uniformly distributed and flow through the small holes 10 at the lower end of the module 4 so that air bubbles can be produced between fibres 9. Air bubbles then flow upwards producing shear force to scour solids accumulated on the membrane surfaces. If the resistance around the holds 10 is variable due to varying resistance provided by different regions of the fibre bundle, gas/air will tend to flow through those holds associated with a lower resistance, resulting in by-pass flow through these holds.

In the manufacture of membrane modules 4, it is desirable to pot the fibres 9 in a uniform distribution relative to the holes 10. Moreover, smaller and more holes will help distribution of gas/air, but holes that are too small will reduce bubble size and thus the shear force applied to the outer surface of the fibres. It is preferable that size of holes should be within the range of 0.01 to 5 mm, however, it will be appreciated that the size and position of holes 10 will vary with module size, fibre packing density, fibre diameter, fibre pore size and other factors.

Another way to reduce maldistribution of gas/air is to use a layer of porous sheet (not shown) which has much smaller pore size than the holes 10. In this case, the major pressure drop of air will be across the porous sheet. If the porous sheet has uniformly distributed pores, the air distribution across the air end of the module will tend to be evenly spread.

Figure 6:
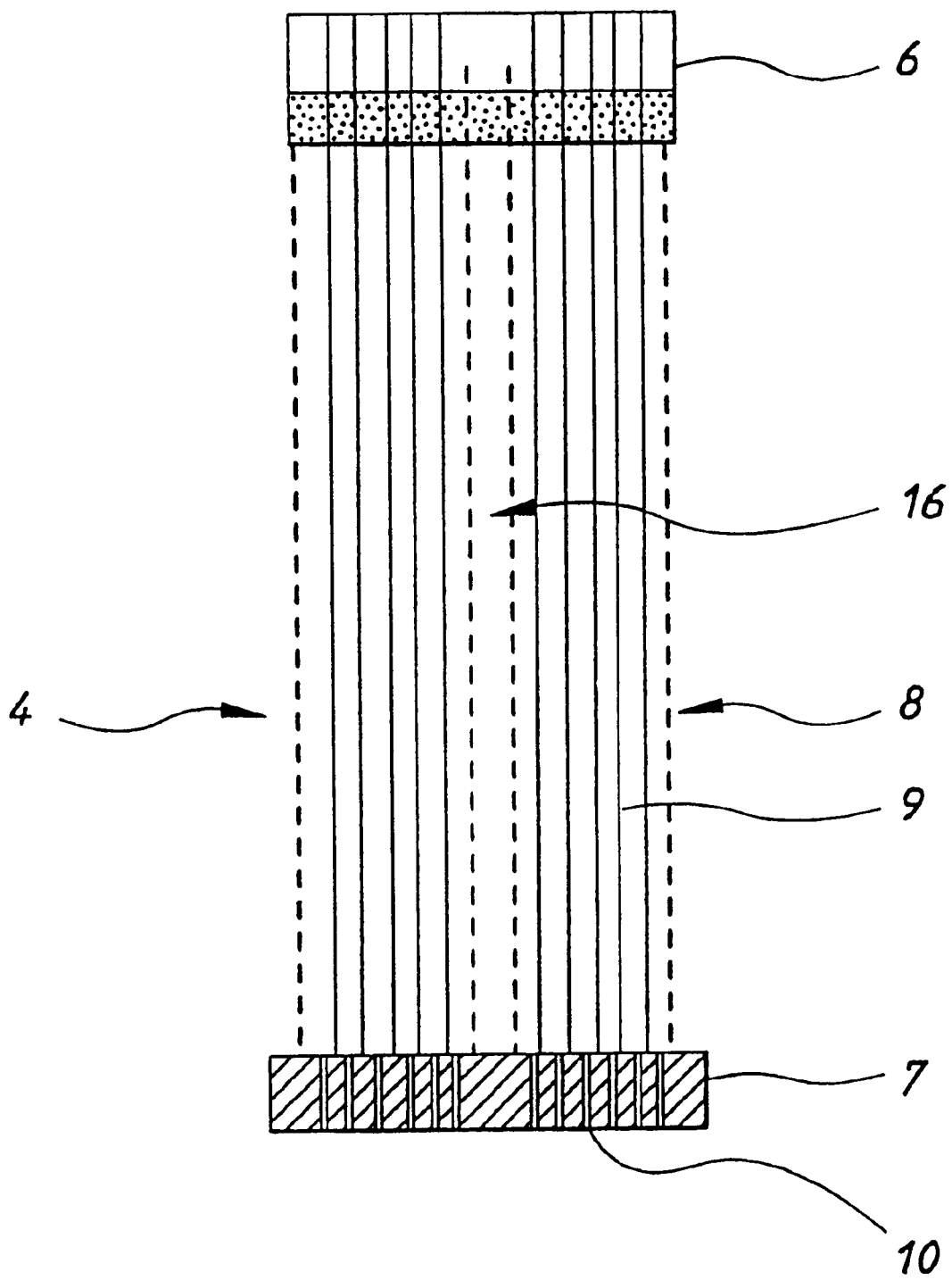
FIG. 6 shows a simplified cross-sectional view of an alternate embodiment of the membrane module according to the present invention.

To further improve distribution of air bubbles, a porous tube 16 can be inserted in the centre of the cylindrical module 4. When air passes through porous tube 16, it produces uniform bubbles which pass out through the array of fibres scouring solids on the fibre membrane walls, It will be appreciated that more than one porous tube could be used and such tubes could be distributed throughout the bundle. Fibres of large pore size or made of non-woven material could also be used as porous tubes within the bundle. FIG. 6 illustrates this form of module.

Figure 7:
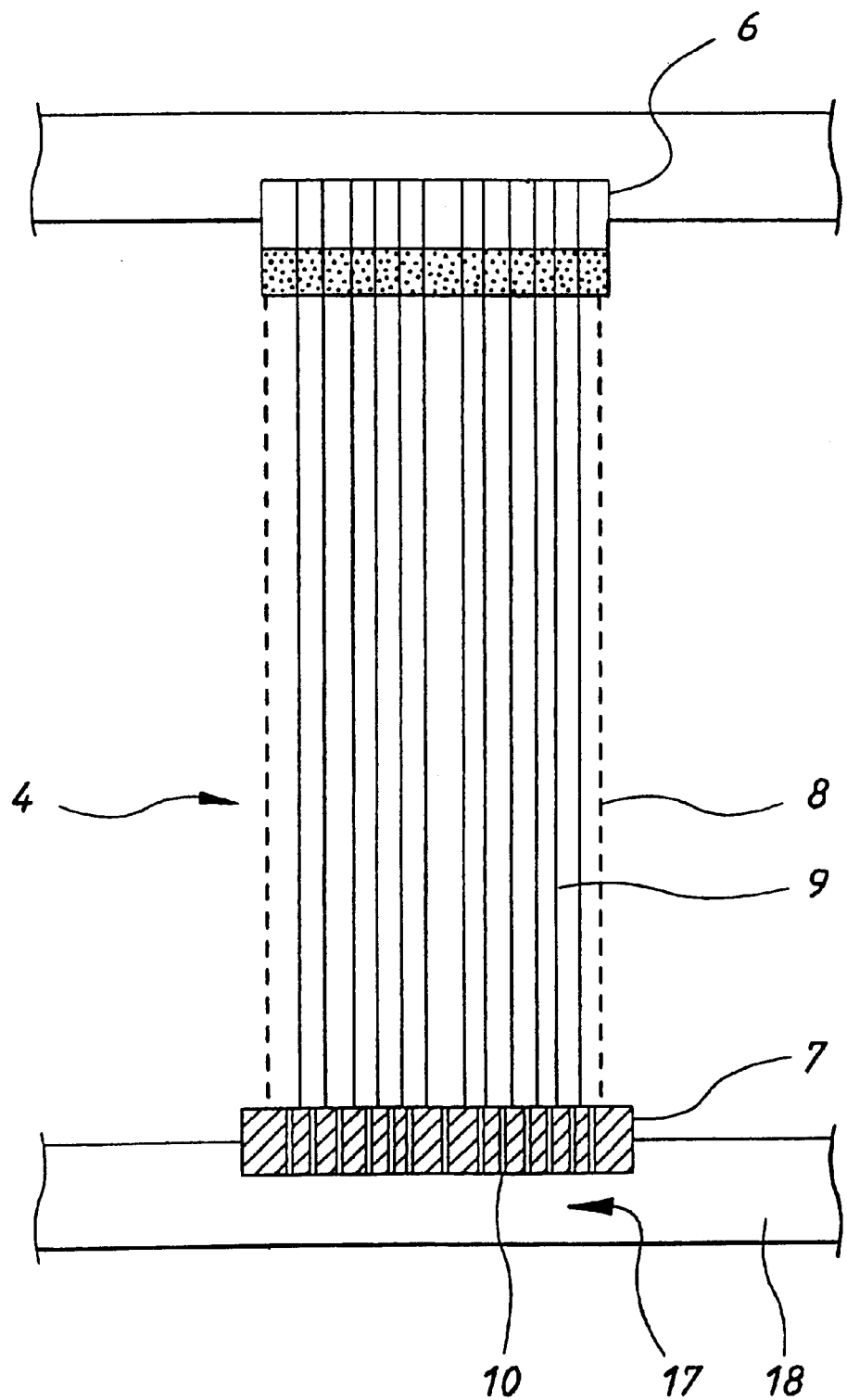
FIG. 7 shows a simplified cross-sectional view of an alternate embodiment in terms of feeding air to the membrane module of the present invention.

Referring to FIG. 7, air may be fed into a plenum chamber 17 below the aeration holes 10 by an air supply tube running from above the feed tank to the bottom of the membrane module. This tube may run down the centre of the membrane module or down the outside. The plenum chamber 17 may also be connected to or form part of a lower manifold 18 which may be used alternately for supply of aeration gas or as a liquid manifold for removal of concentrated backwash liquid from the tank during draindown or backwashing from the bottom of the module.

Figure 8A:
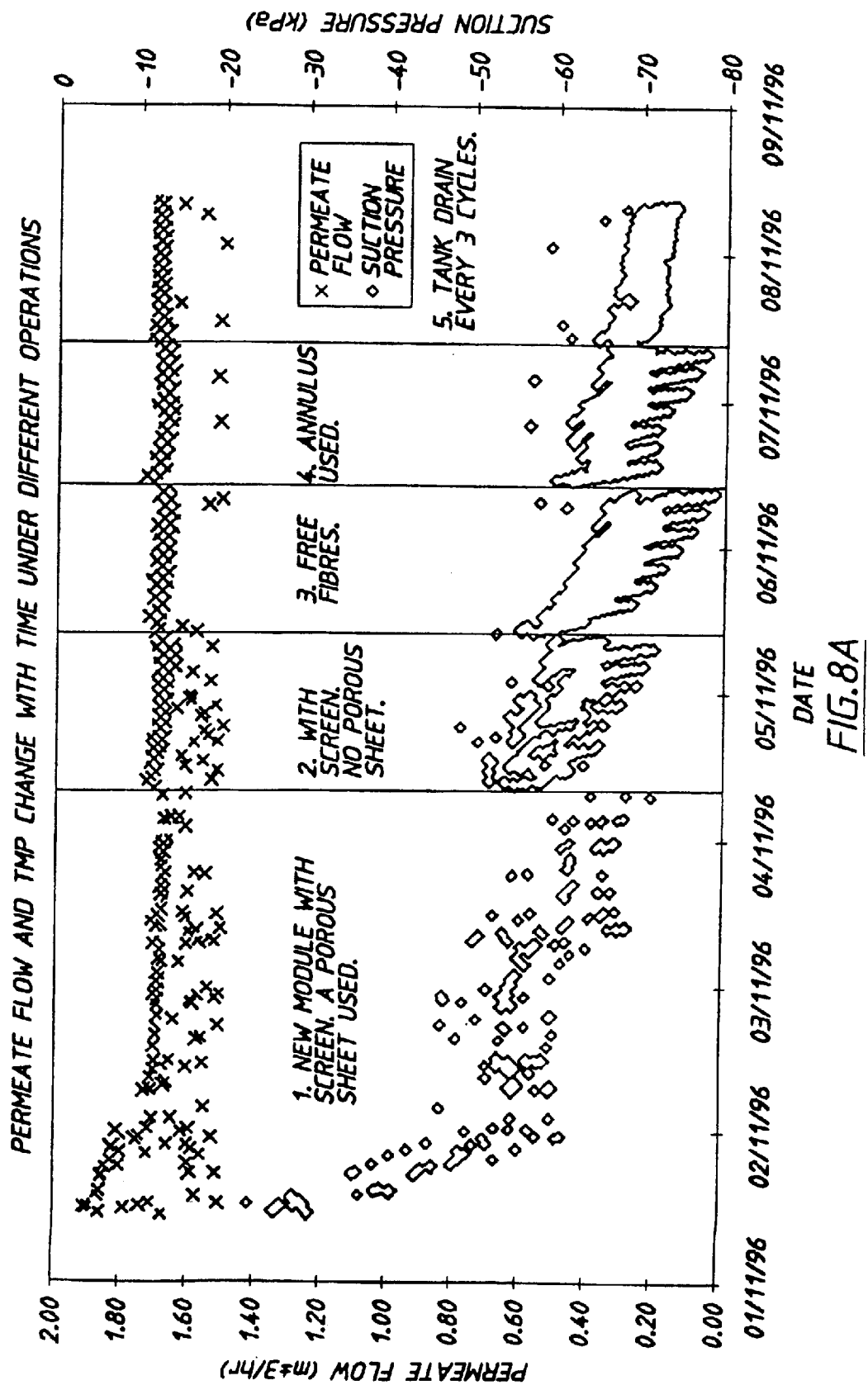
FIGS. 8A and 8B shows two graphs illustrating the suction performance of the module under different conditions.
Figure 8B:
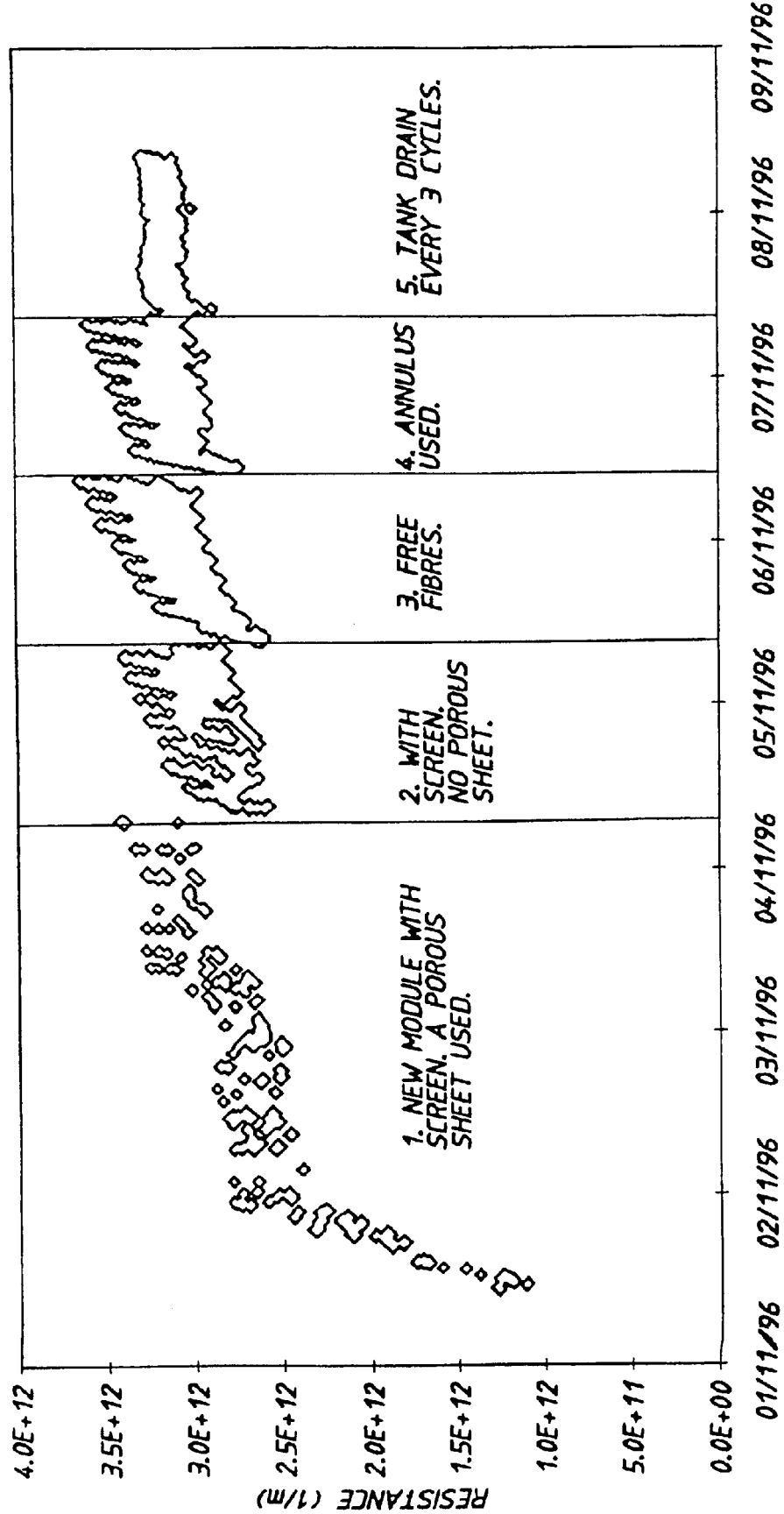

FIGS. 8A and 8B shows the trial results of the same module under different conditions labelled by several zones. The water in the cylinder tank was drained down every 10 cycles in zones 1 to 4. The discharge rate of concentrated liquid waste is thus calculated as 3.2% of the feed volume. Zone 5 was run under the discharge of liquid waste every 3 cycles at a rate of 10.2% of the feed.

Zones 1 and 2 compare the effect of using a porous sheet at the air end on the suction performance for the module with a screen surrounding the fibre bundle. Initially the suction pressure decreased (i.e. TMP increased) quickly because of the module was new. Then both suction pressure and resistance tended to be stable. By comparison, the increase in suction resistance was faster after removing the porous sheet as illustrated in Zone 2. These results illustrate that the air end combined with a porous sheet helps to distribute air between fibres.

The use of the screen 8 has a dual effect on filtration. The restriction of fibre movement by screen facilitates solid accumulation during suction. On the other hand, limited free space between fibres reduces coalescence of air bubbles, producing better scouring effect. It has also been found that the restriction of fibre movement in conjunction with the movement of gas bubbles produces high frequency vibrations in the fibres and rubbing between the closely packed fibre surfaces which further improves the removal of accumulated solids. Zones 3 and 4 in FIGS. 8A and 8B represent results for the same modules with and without a screen. During the operation in Zone 3 some by-pass of air bubbles was observed. This was due to different resistance around the aeration holes, especially on the border where comparatively less fibres were distributed around those holes. We therefore used a porous annulus sheet covering holes at the outer border of the lower potting head. Results in Zone 4 show the improvement compared to Zone 3.

Solid concentrations is an important issue to filtration and fouling rate. When a tank drain was carried out every 10 cycles, solids were built up quickly, which influenced filtration performance. When the tank was drained down every 3 cycles, the increase in suction resistance was significantly reduced as reflected in Zone 5.

Figure 9:
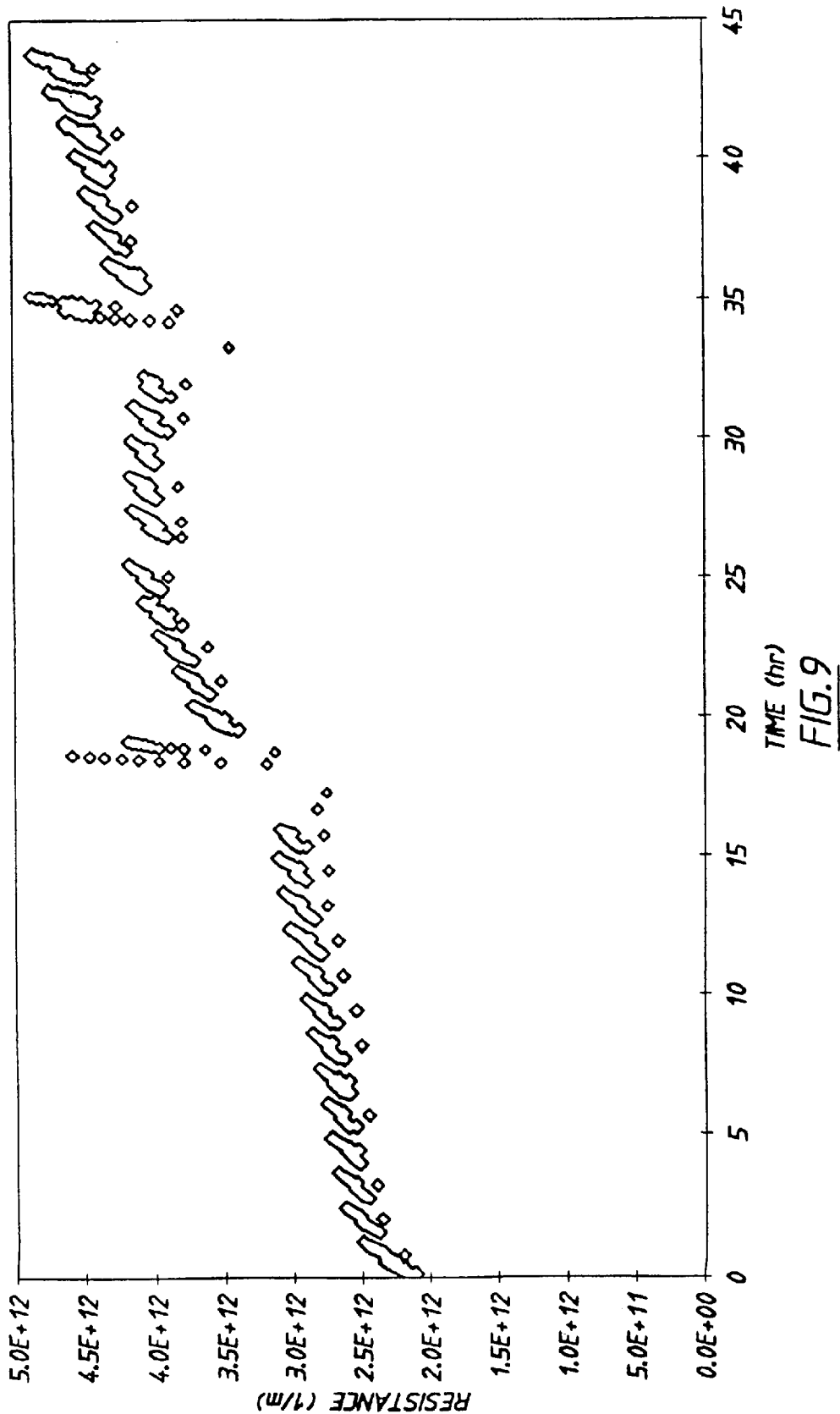
FIG. 9 shows a graph of resistance increase over time with 30 minute suction stage.

The frequency of air scrubbing and backwash on the filtration performance was also investigated. FIG. 9 shows the resistance increase for 30 minute suction and then backwash and air scrubbing. Compared with the resistance increase in Zone 5 in FIG. 8, resistance increase was faster when suction time was longer between backwashes.

Figure 10:
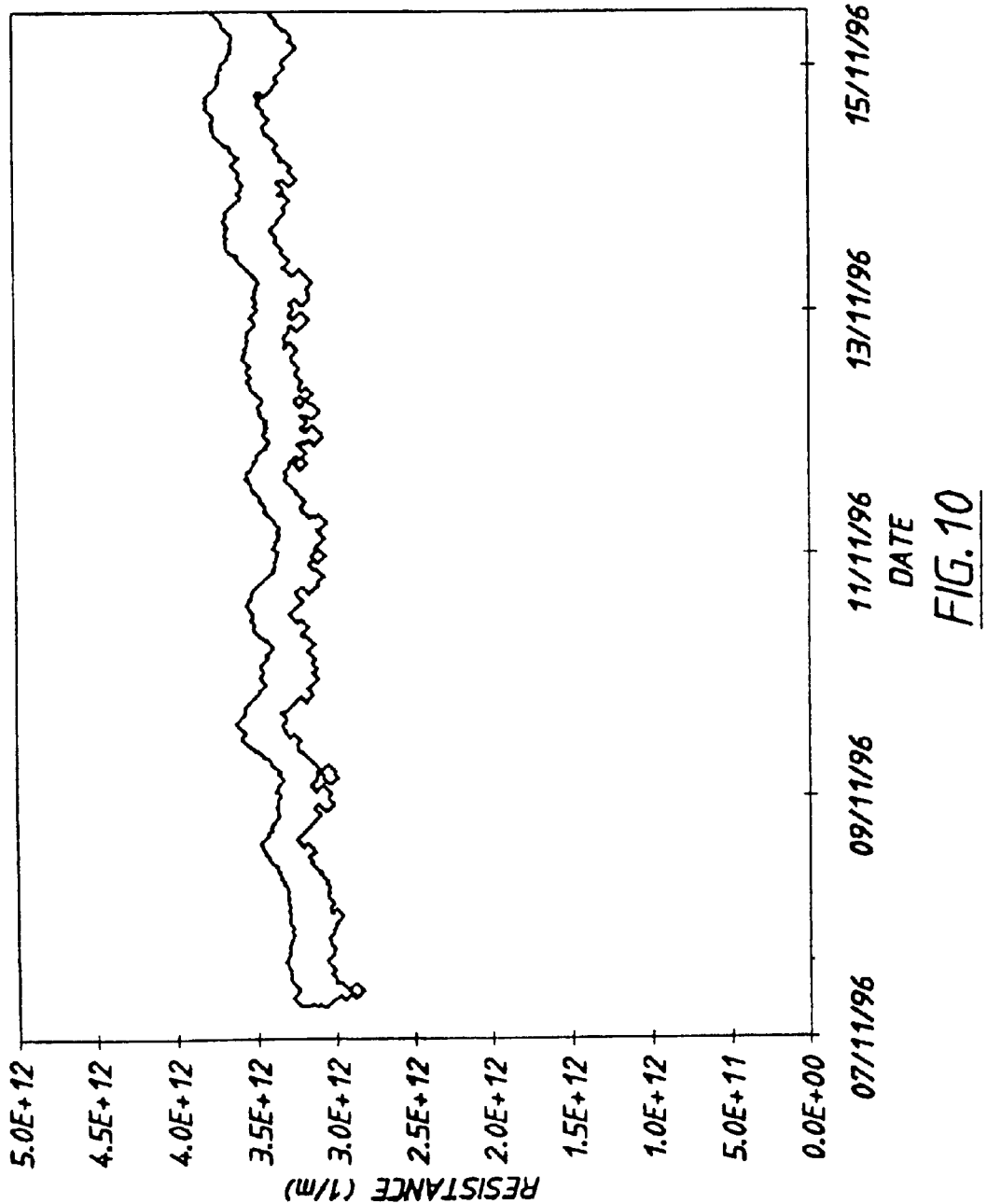
FIG. 10 shows a graph of resistance increase over time between backwashes without a porous sheet.
Figure 11:
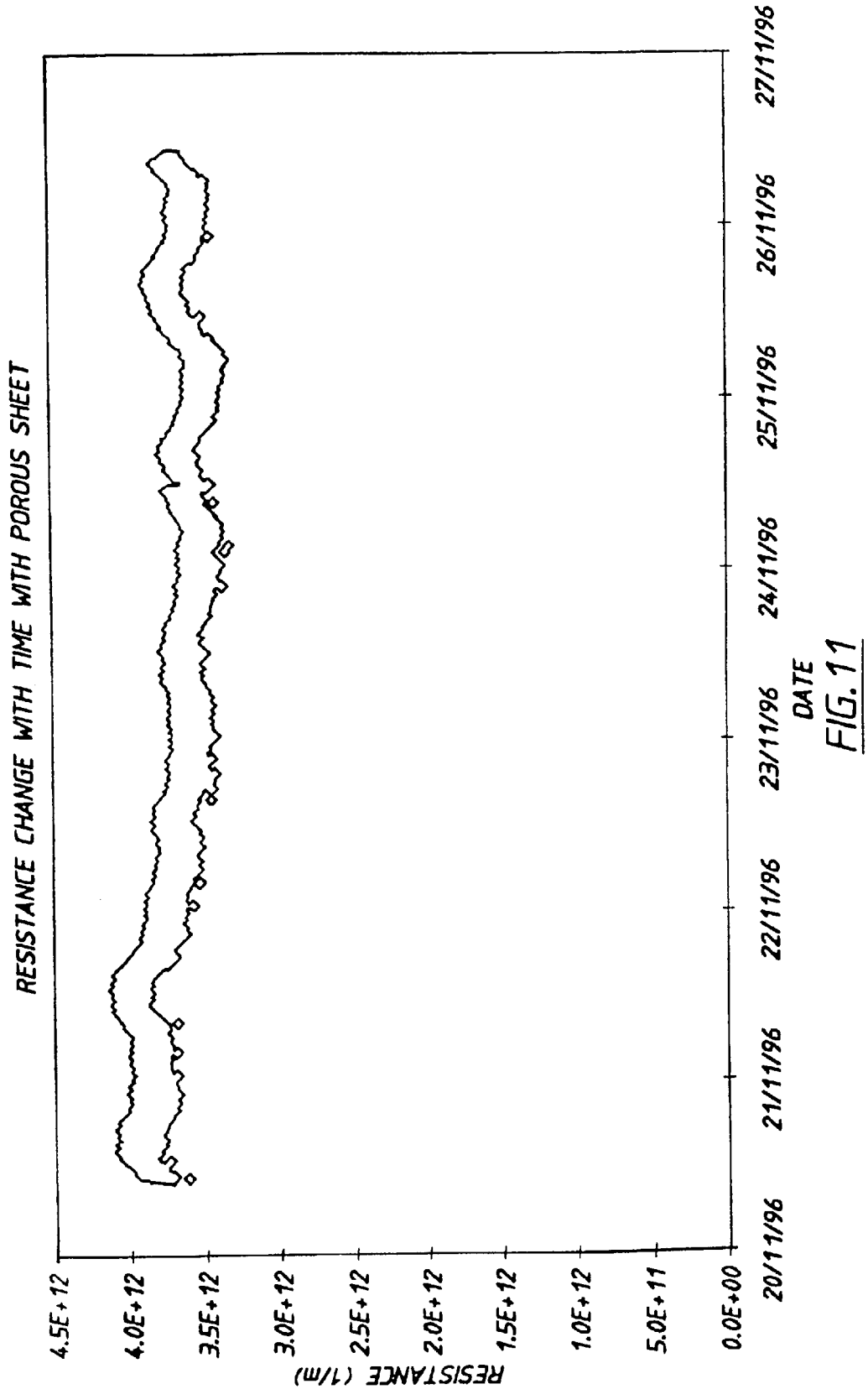
FIG. 11 shows a graph of resistance increase over time between backwashes with the porous sheet.

Longer term trials were conducted to compare the effect of porous sheet on suction performance. FIGS. 10 and 11 show the resistance increase for more than 6 days operation, with and without the porous sheet. For the module not connected to a porous sheet, suction resistance increased slowly by ca 20% during 8 days, while no obvious resistance increase during 6 days operation when a porous sheet was used to improve air distribution. These results and the result shown in Zones 1 and 2 in FIG. 8 suggest that a porous sheet helps uniform air distribution.

Figure 12:
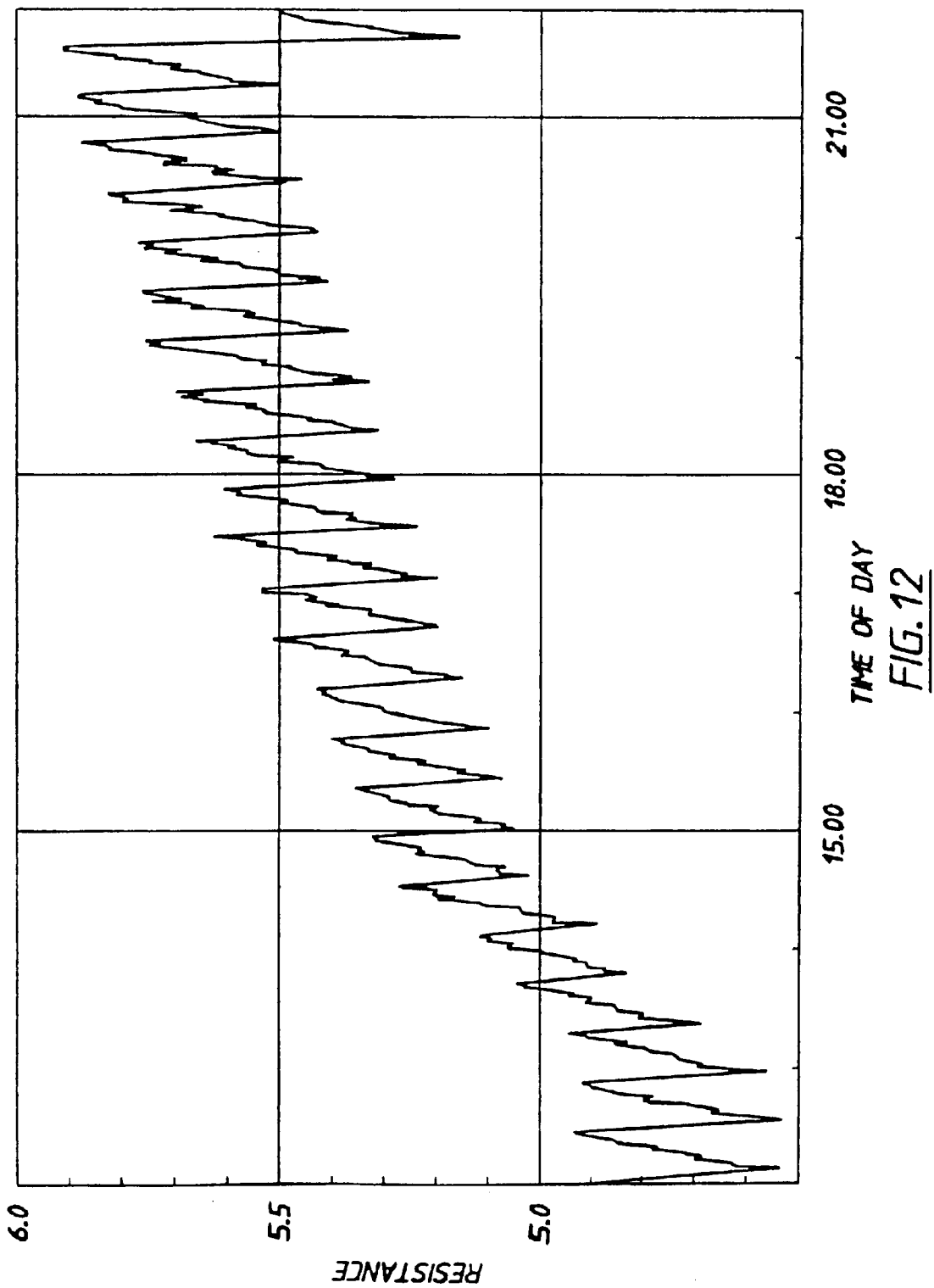
FIG. 12 shows a graph of resistance changes over time with gas bubble scouring at regular intervals but no liquid backwash of the fibre membranes.
Figure 13:
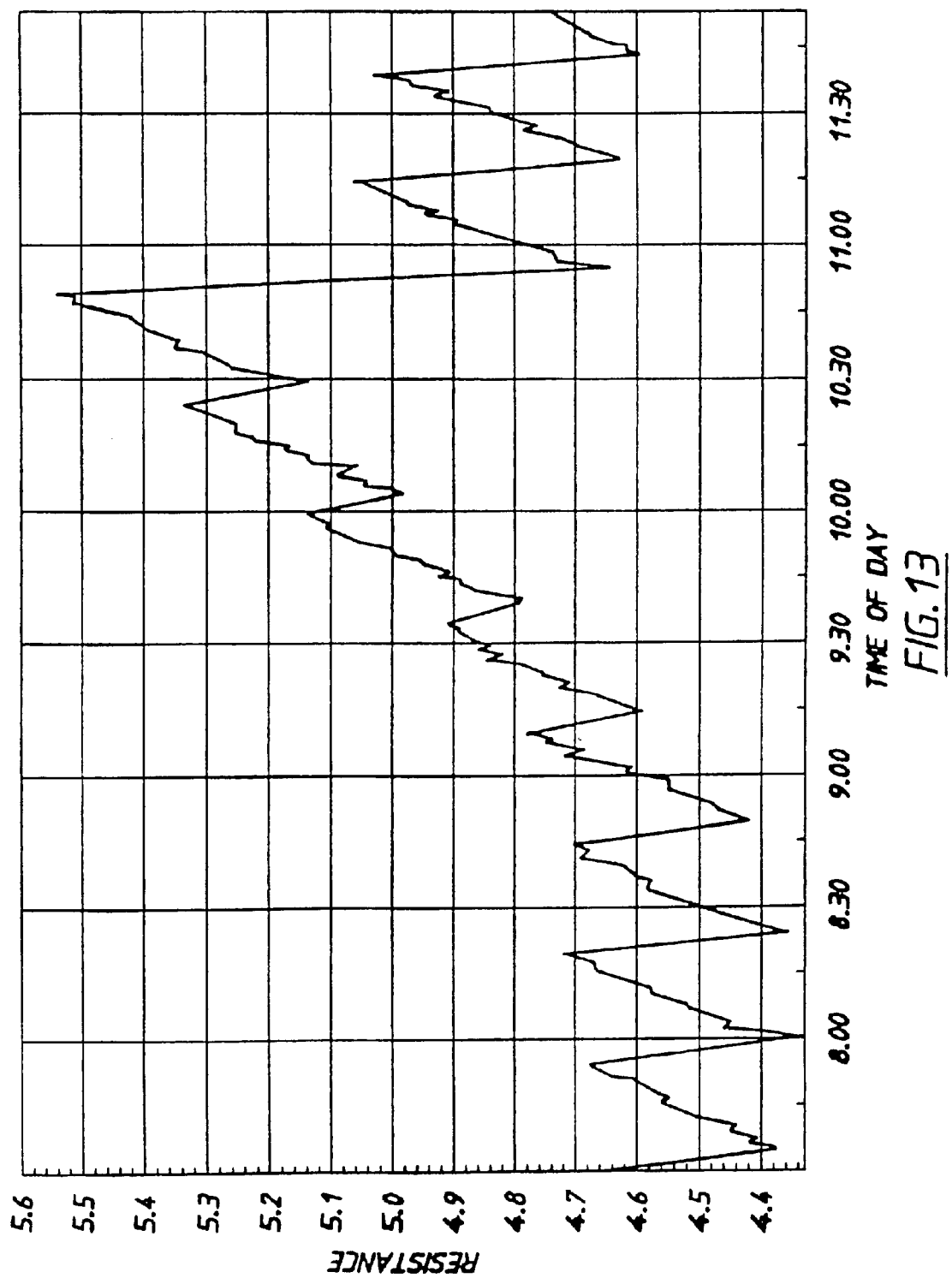
FIG. 13 shows a similar graph to FIG. 12 illustrating the effect of no bubble scouring on backwash efficiency.
Figure 14:
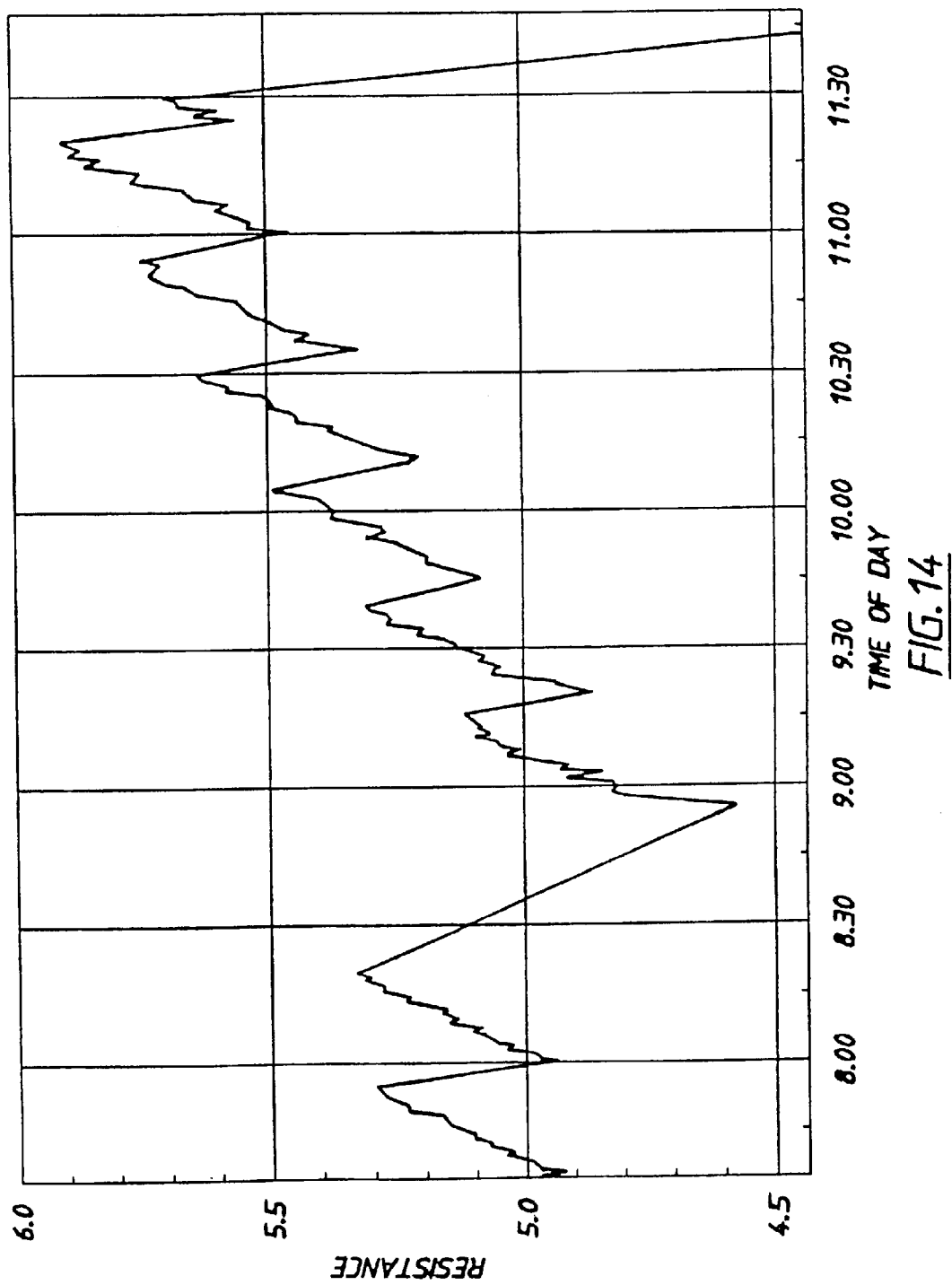
FIG. 14 shows a similar graph to FIG. 12 illustrating the effect of applying gas bubble scouring to the outer side of the fibre bundle only.

FIGS. 12–14 are graphs which illustrate the effect of the bubble scouring on backwash efficiency. The scouring is conducted a regular intervals as shown the buildup of resistance followed by a sharp decline at the time of the scouring stage.

FIG. 12 shows the effect of not using a liquid backwash in conjunction with the gas scouring. At the beginning of the test a normal liquid backwash were filtrate is pumped back through the fibre lumens as a liquid backwash in conjunction with the gas scouring along the outside of the fibres. The liquid backwash was then stopped and only regular gas scouring was used. It was found that even without the liquid backwash a backwash efficiency of around 90% could be achieved.

FIG. 13 shows the effect of no gas scouring during the backwash phase. Again the initial part of the test used a normal liquid backwash where filtrate is pumped back through the fibre lumens as a liquid backwash in conjunction with the gas scouring along the outside of the fibres. The gas scouring was then stopped between about 9:15 and 10:45. As shown on the graph the backwash efficiency dropped dramatically from about 96% using gas scouring to about 41% without gas scouring. The return of gas scouring shows a marked improvement in backwash efficiency.

FIG. 14 illustrates the effect of scouring fully within the bundle as against scouring only the outer fibres. Again the beginning of the test shows a normal backwash regime with liquid backwash and gas scouring up until around 9:00. The gas scouring was then limited to the outside of the fibre bundle. The backwash efficiency again degraded dramatically from about 98% during normal operation to 58% with the restricted gas scouring.

The embodiments relate to membrane filtration systems and typically to a system using suction to produce transmembrane pressure, however, it will be appreciated that the scouring system is equally applicable to any form of fibre membrane filtration process, including pressurised filtration systems.

The scouring process and method may be used in conjunction with any standard backwashing regimes including liquid backwashing, pressurised gas backwashing, combinations of both, as well as with chemical cleaning and dosing arrangements.

The scouring process would normally be used in conjunction with the backwash stage, however, it may also be used continually during the filtration and backwash stages. Cleaning chemicals such as chlorine may be added to the gas providing the bubbles to further assist the scouring process. Solids removed in the scouring process may be intermittently or continually removed. With continual removal of solid a clarifier or the like can be used. The clarifier can be used in front of the module, in parallel with module or the module can be in the clarifier itself. Chemical dosing can be used in conjunction with the clarifier when required.

The filter system using such a scouring process may be used for sewage/biological waste treatment or combined with a bioreactor, activated sludge or similar system.

It will be appreciated that further embodiments and exemplifications of the invention are possible without departing from the spirit or scope of the invention described.

What is claimed is:

1. A membrane module comprising a plurality of porous hollow membrane fibres, each of the fibres having an upper and a lower end, the fibres extending longitudinally between and mounted at the upper end to an upper potting head and at the lower end to a lower potting head, wherein the fibres are sealed at the lower end and open at the upper end to allow removal of filtrate, the fibres being arranged in close proximity to one another and mounted in a bundle in a substantially taut manner between the upper and lower potting heads to prevent excessive movement therebetween, wherein the fibres are surrounded by a perforated cage to further prevent excessive movement of the fibres, the fibres being substantially uniformly mounted in the lower potting head relative to a distributed array of aeration holes in the lower potting head, wherein the aeration holes are sized and located such that bubbles, formed by a pressurized gas passing therethrough when the module is immersed in a liquid, pass substantially uniformly between the fibres, and wherein the lower potting head is connected to a source of the pressurized gas, and wherein the fibres are arranged to be vibrated by means of the gas bubbles, the fibres being mounted relative to one another so as to produce a rubbing effect between the fibres when vibrated by the gas bubbles.

2. A membrane module according to claim 1 further comprising a porous sheet through which gas is supplied for providing gas bubbles from within the module.

3. A membrane module according to claim 1 further comprising at least one porous tube located within the module for providing gas bubbles from within the module.

4. A membrane module according to claim 1 further comprising a tube or tubes positioned to output gas within the module for providing gas bubbles from within the module.

5. A membrane module according to claim 4 wherein the tubes are in the form of a comb of tubes containing holes which sit within the module.

* * * * *